United States Patent [19]

Kingham

[11] Patent Number: 5,480,865
[45] Date of Patent: Jan. 2, 1996

[54] NUTRITIONAL COMPOSITION

[75] Inventor: Douglas J. Kingham, Kettleby, Canada

[73] Assignee: Parkinson's Charitable Trust, Toronto, Canada

[21] Appl. No.: 202,065

[22] Filed: Feb. 25, 1994

[51] Int. Cl.$^6$ .............................. A61K 31/00; A23J 1/00
[52] U.S. Cl. .................... 514/2; 514/21; 514/23; 424/418; 424/439; 426/72; 426/656; 426/658
[58] Field of Search .................... 514/2, 21, 23; 424/418, 439, 440, 451, 464; 426/72, 656, 658

[56] References Cited

U.S. PATENT DOCUMENTS

| | | | |
|---|---|---|---|
| 4,377,595 | 3/1983 | Wurtman | 424/319 |
| 4,435,424 | 3/1984 | Wurtman | 424/319 |
| 4,542,123 | 9/1985 | Wurtman | 514/3 |
| 4,624,852 | 11/1986 | Wurtman | 514/77 |
| 4,690,820 | 9/1987 | Simko | 424/128 |
| 4,737,489 | 4/1988 | Wurtman | 514/76 |
| 4,775,665 | 10/1988 | Wurtman | 514/76 |
| 4,837,219 | 6/1989 | Hutterer | 514/400 |
| 4,898,879 | 2/1990 | Modser et al. | 514/400 |
| 5,096,712 | 3/1992 | Wurtman | 424/422 |
| 5,118,670 | 6/1992 | Wurtman et al. | 514/18 |
| 5,206,218 | 4/1993 | Wurtman et al. | 514/2 |
| 5,326,569 | 7/1994 | Acosta et al. | 424/440 |

FOREIGN PATENT DOCUMENTS

| | | |
|---|---|---|
| 1140858 | 2/1983 | Canada . |
| 1140859 | 2/1983 | Canada . |
| 2050585 | 10/1990 | Canada . |
| 0176094 | 4/1986 | European Pat. Off. . |
| 0184999 | 6/1986 | European Pat. Off. . |
| 0259167 | 3/1988 | European Pat. Off. . |
| WO07262 | 12/1986 | WIPO . |
| WO03633 | 3/1993 | WIPO . |

OTHER PUBLICATIONS

Olendorf, W. H. "Brain Uptake of Radiolabeled Amino Acids, Amines, and Hexones After Arterial Injection", Am J. Physiol. (1971) 221: 1629–1639.

Leenders, K. L. et al., "Inhibition of L–18F–Flurodopa Uptake Into Human Brain by Amino Acids . . . Tomography" . Ann. Neurol. (1986) 20: 258–262.

Nutt, J. G. On–Off phenomenon: "Relation to Levodopa Pharmacokinetics and Pharmacodynamics", Ann. Neurol. (1987) 22: 535–540.

Piucus, J. et al., "Influence of Dietary Protein on Motor Fluctuations in Parkinson's Disease". Arch. Neorol. (1987) 44: 270–272.

Pincus, J. et al., "Plasma Levels of Amino Acids Correlate with Motor Fluctuations in Parkinsonism". Arch. Neurol. (1987) 44: 1006–1009.

Pincus, "Protein Redistribution Diet Restores Motor Function . . . Patients with Dopa–Resistant off" Periods. Neurol. (1988) 38:481–483.

Yen, P. K., "Does a Low–Protein Diet Help with Parkinson's?" Geriatric Nursing (1990) (Jan./Feb.) 48.

Nutt, J. G. et al., "Dietary . . . of Parkinson's Disease", Ch. 28 in Therapy . . . Disease, edited by W. C. Koller and G. Paulson, (1990) Decker Press, N.Y.

F. Bracco et al., "Protein Redistribution Diet and Antiparkinsonian Response to Levodopa", Eur. Neurol. (1991) 31: 68–71.

Karstaedt, P. J. et al., "Standard and Controlled–Release . . . Disease on a Protein Redistribution Diet" Arch Neurol. (1991) 48: 402–405.

Croxson, S. et al., "Dietary Modification of Parkinson's Disease". European Journal of Clinical Nutrition (1991) 45: 263–266.

Berry, E. M. et al., "A Balanced Carbohydrate: Protein Diet in the Management of Parkinson's Disease" Neurology (1991) 41: 1295–1297.

Cerrato, P. L., "Diet Therapy Helps This Drug Work Better" RN (1991) 54(2): 71–2, 74.

Kempster, P. A. et al., "Dietary Factors in the Management of Parkinson's Disease", Nutritional Reviews (1994) 52: 51–58.

Primary Examiner—Michael G. Wityshyn
Assistant Examiner—Abdel A. Mohamed
Attorney, Agent, or Firm—Fitzpatrick, Cella, Harper & Scinto

[57] ABSTRACT

Nutritional compositions are provided for the management of protein intake which have a carbohydrate to protein ratio of at least about 3.5:1 and a ratio of one group of amino acids to another group of amino acids of from about 3:1 to about 6.5:1 where the one group consists of glycine, serine, lysine, alanine, aspartic acid, glutamic acid, proline, arginine and hydroxyproline and the other group of amino acids consists of phenylalanine, tryptophan, threonine, valine, isoleucine, histidine, leucine, tyrosine and methionine. The compositions provide minimized interference with large neutral amino acid (LNAA) type therapeutic agents.

22 Claims, No Drawings

NUTRITIONAL COMPOSITION

BACKGROUND OF THE INVENTION

This invention relates to a nutritional composition and more particularly to a nutritional composition for the management of protein intake.

Protein intake, especially in human beings, has received the considerable attention of researchers, nutritionists, medical personnel and others concerned with health issues related to alimentation. Indeed, the general awareness of the public of the important links between health, longevity, morbidity and the quality of life in senescence, on the one hand, and diet, on the other hand, is reflected in the popular adage "you are what you eat".

Protein intake is especially relevant in cases where a patient suffers from a malady requiring treatment with one or more therapeutic agents which may be hindered or blocked by the presence of protein. Whether a therapeutic agent will be hindered or blocked and to what extent depends on the nature of the agent and the nature of the malady.

One such malady is Parkinson's disease. Parkinson's disease is an ancient disease and is now understood to be a result of a reduction, sometimes substantial, of levels of an important neurotransmitter, dopamine, as a result of the decadence of nigrostriatal dopaminergic neurons. This results in a variety of manifestations, the most common of which are movement disorders and fatigue. The movement disorders may be uncontrolled actions (including tremor) or poverty of movement such as muscular rigidity.

Until the 1960's, researchers had been attempting to increase levels of dopamine in the brain in order to treat Parkinson's disease. These attempts failed due to the inability of dopamine to cross the blood brain barrier. In the 1960's, the discovery was made that levels of dopamine in the brain could be increased by the oral or parenteral administration of a substance called levodopa. Levodopa is recognized in the literature as a "large neutral amino acid" or "LNAA" (see Nutt, J. G. and Carter, J. H., "Dietary Issues in the Treatment of Parkinson's Disease", Chapter 28 in *Therapy of Parkinson's Disease,* edited by William C. Koller and George Paulson, (1990) Decker Press, New York) and is a hydroxyphenylalanine of the chemical formula (–)-3-(3,4-dihydroxyphenyl)-L-alanine. As used herein, "LNAA" refers to amino acids which are neutral in that they have only one carboxyl group and one amino group and which generally have a molecular weight greater than 130. Included within the group of LNAAs are phenylalanine, tryptophan, threonine, valine, isoleucine, histidine, leucine, tyrosine and methionine.

It has been known for some time that the reduction of protein intake can assist in the treatment of individuals being administered an LNAA-type therapeutic agent such as levodopa. This is based on the theory that the amino acids constituting protein will compete with the therapeutic agent to cross the blood brain barrier and, thus, will reduce the amount of therapeutic agent ultimately crossing that barrier. This competition results in a lessening of the therapeutic effect of the therapeutic agent or a fluctuation in the response of the patient due to fluctuating levels of competing amino acids in the bloodstream as protein is ingested and metabolized (see Pincus, J. H. et al., Plasma levels of amino acids correlate with motor fluctuations in parkinsonism. *Arch. Neurol.* (1987) 44:1006–1009; Nutt, J. G., On-off phenomenon: Relation to levodopa pharmacokinetics and pharmacodynamics. *Ann. Neurol.* (1987) 22:535–540; Leenders, K. L. et al., Inhibition of L-18F-fluordopa uptake into human brain by amino acids demonstrated by positron emission tomography. *Ann. Neurol.* (1986) 20:258–262).

Protein redistribution diets to date have concentrated on eliminating or reducing total protein in a given meal or meals or for a given period of the day. In the case of Parkinson's disease, some protein redistribution diets have been described as being virtually protein-free until the evening meal (see F. Bracco et al., Protein redistribution diet and antiparkinsonian response to levodopa. *Eur. Neurol.* (1991) 31:68–71) and as comprising eliminating daytime protein (see Karstaedt, P. J. et al., Standard and controlled-release levodopa/carbidopa in patients with fluctuating Parkinson's disease on a protein redistribution diet. *Arch. Neurol.* (1991) 48:402–405). Other protein redistribution diets restrict protein consumption during the day to e.g. no more than 7 grams (see Pincus, J. et al., Influence of dietary protein on motor fluctuations in Parkinson's disease. *Arch. Neur.* (1987) 44:270–272; Pincus, J. et al., Protein redistribution diet restores motor function in patients with dopa-resistent "off" periods. *Neurology* (1988) 38:481–483; Pincus, J. et al., Plasma levels of amino acids correlate with motor fluctuations in Parkinsonism. *Arch. Neurol.* (1987) 44:1006–1009).

U.S. Pat. No. 4,690,820 discloses a high-caloric, high-fat dietary composition having a carbohydrate to protein ratio of 3:1 to 3.7:1 also deriving 45–75% of its calories from fat in the amount of 120–325 grams per liter. U.S. Pat. No. 5,206,218 discloses a method and composition for reducing post-prandial fluctuations in LNAA plasma levels wherein the composition administered has a carbohydrate to protein ratio of from about 3:1 to about 6:1, preferably 4:1.

There are a number of disadvantages to the above-noted diets and compositions. A disadvantage to the severely protein-restricted or protein-free diets is that the evening meal must contain a relatively substantial amount of protein in order to satisfy the body's need for essential amino acids and to avoid consequent malnutrition. Compliance with such a regimen can be very difficult for individuals who do not have the appetite or the ability to consume such a substantial amount of protein. Additionally, the often severe onset of parkinsonian symptoms following the high intake of protein in the evening necessary for adequate nutrition is a major disadvantage. Another disadvantage also causing non-compliance is that the protein deficiency borne during the day by the patient may lead to intolerable, or at least bothersome, hunger pangs throughout the day. All of the above diets and compositions suffer from the disadvantage that there is no management of the type of protein (if any) which is administered.

Existing meal replacement products, including low protein products, available on the market tend to rely on high levels of caseinates, such as sodium and calcium caseinates, and/or whey or whey extracts for the source of protein contained in such products. However, these proteins are rich in LNAAs, especially leucine and isoleucine. Accordingly, while a low protein product may be advantageous in that lower protein overall will benefit a patient needing reduced LNAA competition at the blood brain barrier, if the protein which is present in the low protein product is largely constituted by LNAAs, the maximized benefit will not be realized.

SUMMARY OF THE INVENTION

In accordance with the present invention, there is provided a nutritional composition for the management of protein intake which has a first weight-to-weight ratio of carbohydrate to protein of at least about 3.5:1 where the protein component has a particular amino acid composition characterized by a second ratio of one group of amino acids to another group of amino acids. The first group of amino acids (referred to herein as "Group A") consists of glycine, serine, lysine, alanine, aspartic acid, glutamic acid, proline, arginine and hydroxyproline. The second group of amino acids (referred to herein as "Group B") consists of phenylalanine, tryptophan, threonine, valine, isoleucine, histidine, leucine, tyrosine and methionine. The weight-to-weight ratio of the Group A amino acids to Group B amino acids is from about 3:1 to about 6.5:1. Preferably, the first ratio, that of carbohydrate to protein, is from about 7:1 to about 12:1, more preferably from about 7:1 to about 8:1 and most preferably is about 7.5:1. Preferably, the second ratio (A:B) is from about 4:1 to about 5:1. Most preferably, the A:B ratio is about 4.5:1.

In another aspect of the present invention, there is provided a nutritional composition which has a particular amino acid composition characterized by a ratio of a different group of amino acids (referred to herein as "Group A*") to the second group of amino acids (Group B) noted above. Group A* consists of glycine, glutamic acid, proline and hydroxyproline. The weight-to-weight ratio of the first different group to the second group (A*:B) is from about 1.5:1 to about 4.5:1 and preferably from about 2.5:1 to about 3.5:1. Most preferably, the A*:B ratio is about 3:1.

A yet further aspect of the present invention is a method for facilitating the transport of LNAA-type therapeutic agents across the blood brain barrier in a mammal comprising the administration of the compositions of the present invention. In preferred embodiments, the therapeutic agent is levodopa, the mammal is a human being, and the human being is afflicted with Parkinson's Disease. In a further preferred embodiment, the composition is administered at lunchtime to the substantial exclusion of any other source of carbohydrate or protein.

The compositions of the present invention provide adequate nutritional intake when consumed in the context of a proper daily diet and are satisfying, yet at the same time do not interfere, or provide minimized interference, with LNAA-type therapeutic agents.

DESCRIPTION OF THE PREFERRED EMBODIMENTS

The carbohydrate component of the compositions of the present invention can be selected from the many known sources of carbohydrate. Appropriate ingredients include a variety of mono-, di- and polysaccharides used as nutritive sources of carbohydrates in food products. Examples of carbohydrates which are constituted by monosaccharides and disaccharides are dextrose, lactose, maltose, fructose (in crystalline form or aqueous solution), sucrose (as crystals or in solution), invert sugar and glucose (in various syrup forms including corn syrup). The carbohydrate may also be sourced from natural foods used as sweeteners which comprise a high carbohydrate content, such as honey, fruit juices and concentrates, maple syrup and maple sugar.

Examples of carbohydrates which are constituted by polysaccharides or mixtures of mono-, di- and polysaccharides are corn syrup solids, various gums, such as xanthan gum, guar gum, carrageenan gum, arabic gum, locust bean gum and tragacanth gum, maltodextrins, glucose syrups, rice syrup, psyllium, pectin, corn starch (including chemically modified and/or pregelatinized corn starch), tapioca starch, rice starch, potato starch, wheat starch, arrowroot starch and cassava starch.

While non-nutritive carbohydrates such as cellulose-based ingredients (for example, microcrystalline cellulose, cellulose gum), polydextrose and sorbitol are used as food ingredients, such non-nutritive carbohydrates are not contemplated for inclusion in calculating the carbohydrate component of the compositions of the present invention.

It will be understood by the skilled addressee that the carbohydrate or blend of carbohydrates selected will depend on the various attributes of the ingredients. For example, different carbohydrates will provide energy more or less quickly and a judicious selection of same can contribute to balancing the delivery of carbohydrate calories to the consumer so that the energy provided is meted out over a period of time. Impacting also on the choice of carbohydrate ingredients is the desired flavor of the finished product. Different carbohydrates have different sweetness impact; for example, very low for 10 DE maltodextrin and very high for fructose. In addition to the consideration of sweetness impact, the carbohydrate or carbohydrates must be chosen for "fit" into the flavor profile of the desired product. Finally, the carbohydrate or carbohydrates will be selected for functionality related to texture and processing characteristics of the desired nutritional composition; for example, modified corn starch will be selected for thickness in a cooked, ready-to-eat pudding, whereas starch would be excluded where the product desired is a beverage, as too much thickness would be undesirable. These and other factors in the selection of appropriate carbohydrates are within the knowledge of those skilled in the nutritional arts.

The protein component of the present invention can be derived from one or more natural sources or by the direct addition of amino acids or by a judicious combination of the two. In the case of naturally-sourced proteins, the nature and content of the protein sources used in the compositions of the present invention must be carefully selected and balanced in order to provide the desired amino acid content. Preferably, a range of essential and non-essential amino acids will be provided, but in any event within the relative limits contemplated herein.

Examples of naturally-sourced proteins useful in the practising of the within invention arranged in order of highest in Group A amino acids versus Group B amino acids to lowest in Group A amino acids versus Group B amino acids are collagen, gelatin, wheat, oats, corn, peas, beans (for example, soybeans) and lentils, egg (whole, yolk and white) and milk proteins. Collagen is a preferred protein for use as a component of the protein sources in the present invention as it is high in Group A amino acids versus Group B amino acids. Particularly preferred is gelatin, a collagen with shorter peptide chain lengths. When gelatin or another collagen is used as a component of the composition, and a liquid product is desired, the hydrolyzed form of same should be used to maintain the liquid consistency desired. Examples of such hydrolyzed materials which are commercially available are POLYPRO® 5000, an edible hydrolyzed collagen (available from Geo Hormel Inc., New Jersey, U.S.A.) and HYDROGEL® A, an edible hydrolyzed gelatin (available from Germantown (Canada) Inc., Toronto, Canada).

It will be understood that, generally speaking, a careful blending of different protein types will be necessary to achieve some content of all or most essential amino acids while at the same time maintaining the ratios of Group A amino acids to Group B amino acids within the limits contemplated in the present invention. For example, a composition containing as the only or principal source of protein a milk protein such as whey or calcium or sodium caseinate will be much too rich in Group B amino acids. The proper balancing of such a milk protein with, for example, a collagen will result in a composition which can meet the limits of the present invention yet still provide an acceptable content of various amino acids.

It is not possible or practical to provide here all the possible permutations and combinations of naturally-sourced proteins which will result in a composition in accordance with the present invention. It is within the ability of those skilled in the art having knowledge of the amino acid contents of given protein sources to devise combinations and relative quantities of such protein sources so as to achieve the ratios provided for herein.

It will also be apparent to those skilled in the art that the protein component of the present compositions may be derived entirely or partly from the direct addition of amino acids (to the extent permitted by relevant food and drug regulations) in amounts relative to the carbohydrate component and each other so as to satisfy the ratios contemplated by the present invention. In the case of partial derivation of the protein component from direct amino acid addition, this may be done in order to supplement the amino acid content derived from naturally-sourced protein in order to meet the ratios contemplated. In the alternative, if direct addition is desired, such may be achieved by the addition of individual amino acids or by the synthesis of polypeptides having a composition such as will, when combined in a given amount with a given amount of carbohydrate, meet the ratios contemplated by the present invention. Methods for the in vitro synthesis of polypeptides and the biosynthesis of polypeptides by host microorganisms encoded for the expression of specifically-sequenced proteins are known.

The nutritional compositions of the present invention may additionally comprise a fat component. Fats occur widely in nature and play several roles and, in particular, in humans, three important roles: structural, storage and metabolic. For this reason, generally speaking, fat is an important component of human nutrition. Fats provide energy when consumed and, in addition, act as carriers of fat-soluble vitamins. Fats are a major contributor of metabolic energy, delivering on average nine calories per gram, in comparison to an average of four calories per gram of protein or carbohydrate.

The calories of fats are either stored in the body for gradual metabolism and release of energy, or used more quickly for energy, depending on the nutritional status of the consumer. To be used as an energy source, fats must be metabolized and, for this reason, supply energy more gradually than small molecules, particularly the monosaccharides (or "simple sugars").

Dietary fats include mixtures of triacylglycerols, phospholipids, cholesterol, other sterols and fat-soluble vitamins. Edible tits and oils are predominantly composed of esters of glycerol with fatty acids. These are called triacylglycerols or triglycerides. The physical and metabolic properties of these molecules are determined largely by the degree of unsaturation and chain lengths of the fatty acids. Monounsaturated fatty acids contain one double bond and polyunsaturated fatty acids contain two or more double bonds. Some fatty acids, components of fats, are essential in the human diet (that is, they are required for normal function but cannot be synthesized by the body). These fats, such as the n-6 and n-3 families of polyunsaturated fatty acids; for example, linoleic acid, are essential dietary nutrients.

Fats are important contributors to the texture and flavor of food products. Mixtures of fats with higher saturated fatty acid content are solid at room temperature; for example, cocoa butter. Mixtures with a high content of unsaturated fatty acids are fluid at room temperature; for example, vegetable oil. These properties affect the selection of specific fats as food ingredients and, accordingly, the nature of the food product desired can dictate the type of fat selected. For example, high polyunsaturate-containing vegetable oil can be used exclusively in fluids such as beverages whereas higher amounts of saturated fats are needed in products with harder textures; for example, a chocolate bar-type product.

During the past several decades, evidence has accumulated that heart disease and some cancers are associated with the consumption of diets high in saturated fatty acids and cholesterol. The growing awareness of the relationship between diet and disease has led to a reduction in saturated fat content in food products and dietary habits. For this reason, as components for use together with the compositions of the present invention, mono- and polyunsaturated fats are preferred, although some level of saturated fat is acceptable. As mentioned above, the blend of fats will depend, in part, on the desired characteristics of the product as well as on the desired nutritional profile.

Appropriate fat sources include a variety of vegetable fats and oils as well as those from animal sources. Because of their generally lower content of saturated fats and absence of cholesterol, vegetable sources are preferred. Examples of acceptable fat components include: vegetable oils relatively higher in unsaturates such as sunflower oil, safflower oil, canola oil, soybean oil, corn oil, cottonseed oil, olive oil, peanut oil, almond oil, walnut oil and sesame oil; vegetable oils relatively higher in saturates such as cocoa butter, palm oil, palm kernel oil, coconut oil and hydrogenated vegetable oils (coating fats, etc.); animal fats relatively higher in unsaturates such as fish oils; animal fats mid-range in unsaturates such as goose, beef and pork fats; and animal fats relatively higher in saturates such as milk fat (butter fat).

The blend of fat components selected for a specific composition will depend on several attributes of the ingredients. Selection will be based on physical properties of the ingredients and those desired in the finished product, as well as on flavor, texture, cost and availability. As well, relative amounts of individual fats may be selected by the person skilled in the nutritional arts based on the provision of essential fatty acids. Finally, the amount of fat will be selected based on providing an appropriate amount of caloric energy for the product; for example, in the range of 150 to 250 calories for a "snack" and in the range of 250 to 600 calories for a "meal".

The compositions of the present invention may also contain added vitamins and minerals. The amount and kind of such vitamins and minerals is normally governed by local health regulatory requirements. Such requirements often specify maximum and recommended quantities or ranges of recommended quantities of vitamins and minerals both on a daily basis and, for example, where a product is intended for use as a liquid diet or as a meal replacement, on a per serving basis. It is noted that, subject to health regulatory requirements for the presence of vitamin B6, such presence is ideally minimized or eliminated where the nutritional composition is intended for use by a person being administered levodopa, since it is known that vitamin B6 interferes to some degree with levodopa uptake in the brain.

The compositions of the present invention may contain other ingredients known to those skilled in the art in order to provide an organoleptically acceptable final product for consumption. For example, additional ingredients may include flavoring materials such as natural and artificial flavors and other ingredients added especially for flavor; for example, specific sweeteners, fruits, salt and flavor enhancers. Also included may be coloring materials including certified color additives and natural color additives such as beet powder, beta carotene and caramel. Spices and seasonings may also be included as well as emulsifiers and stabilizers such as hydrocolloids (for example, carrageenan, xanthan, guar and locust bean gums) and specialized fats (for example, mono- and di-glycerides). In addition, preservatives may be used such as sodium benzoate and potassium sorbate. It should be noted, however, that further ingredients as suggested above should be judiciously selected as to kind and quantity so as to maintain the final composition of the product within the limits of the ratios contemplated by the present invention. For example, if a certain additive deemed necessary for flavoring contains certain amino acids, the amount of natural or synthetic protein or directly-added amino acids may have to be adjusted in order to achieve a product of an acceptable constitution within the scope and meaning of the present invention. As well, it should be noted that many of the carbohydrate, protein and fat components discussed above will also contribute functionality in the various areas of flavoring, coloring, emulsification, stabilization and preservation.

The person skilled in the art will also appreciate means by which the consistency of the present compositions may be modified and prepared so as to provide a liquid pudding-like, or solid composition. In general, product texture will be determined by the unique combination of ingredients and by processing methods. For example, in a liquid beverage, a smooth, creamy texture will result from the judicious selection of specific amounts and balance of proteins, starches, gums and fats in the formulation. As well, the viscosity, or thickness, will depend on the processes used to mix the ingredients and stabilize the suspension (the blending and homogenizing processes, respectively). Similarly, in a pudding product, the texture (creamy, smooth, spoonable, firm) will accrue to the specific ingredients used (modified starches, gums, fats, emulsifiers, etc.) and the processing steps (blending, cooking, homogenizing, cooling, etc.). The finished texture of a solid product, such as a "chocolate bar" will also depend on the ingredients and on the mixing and forming processes.

The compositions of the present invention can be prepared using techniques known to those skilled in the art. For example, in the case of a liquid composition, generally speaking, dry ingredients will be premixed and added to the liquid components (excluding the oily ingredients, if any) and mixed. The oily ingredients will then be added and the mixture homogenized in, for example, a colloid mill. The resultant homogenized mixture will then be heated, canned, sterilized and cooled. Other preparation techniques for liquid compositions and for compositions of other textures, such as puddings and snack bars, are known.

In the alternative, the compositions embodying the present invention may be prepared and packaged in powdered or dried form for reconstitution with water to a liquid or pudding-like texture. The advantage to such a powdered or dried form is that handling and shipping of the product is less expensive than in the case of a fully-constituted product as the product is substantially lighter. Also, properly packaged in moisture-resistant or even moisture-proof packaging, powdered or dried products will benefit from a substantially longer shelf-life.

All of such compositions are contemplated as within the scope of the present invention.

It is to be noted that legislators and regulators in many jurisdictions have enacted statutes and regulations governing the content and labelling of nutritional compositions and, in particular, those compositions intended as "meal replacements". Naturally, the practising of the present invention must always be within the bounds of such statutes and regulations, where applicable. In addition, as those skilled in the nutritional sciences will appreciate, the compositions of the present invention do not supply the necessary complement of essential amino acids and should accordingly be administered to a given individual in accordance with the instructions, and under the supervision, of a qualified health practitioner who will advise such individual of the type of overall diet within which the compositions of the present invention should be consumed.

EXAMPLE 1

A chocolate-flavored liquid composition in accordance with the present invention was made using the following ingredients in the following weight percentages:

|  | wt.% |
| --- | --- |
| skim milk powder | 3.08 |
| hydrolysed gelatin | 2.69 |
| maltodextrin | 9.62 |
| dextrose | 7.69 |
| sugar | 6.92 |
| cocoa | 1.15 |
| lecithin | 0.58 |
| walnut oil | 0.77 |
| fish oil (microencapsulated) | 0.39 |
| fish oil (concentrated) | 0.19 |
| linolenic acid | 0.19 |
| micronized fiber | 1.54 |
| vitamin mixture | 0.15 |
| sunflower oil | 3.46 |
| canola oil | 3.46 |
| water | 58.12 |
|  | 100.00 |

The dry ingredients were weighed and premixed and added to the water with stirring. The oils (preblended) were then added and the mixture was homogenized. The homogenized product was heated to 185° F. and then cooled. Per 260 gram serving, the resulting nutritional composition contained 9.41 grams of protein, 64.04 grams of carbohydrate and 23.50 grams of fat. The carbohydrate to protein weight to weight ratio of the composition was 6.81:1 and the protein to fat weight to weight ratio was 0.40:1. The weight to weight ratio of Group A amino acids to Group B amino acids was 3.39:1 and the weight to weight ratio of Group A* amino acids to Group B amino acids was 2.12:1.

EXAMPLE 2

A chocolate-flavored liquid composition was prepared using the method of manufacture of Example 1 containing the following ingredients in the following weight percentages:

|  | wt.% |
| --- | --- |
| water | 60.49 |
| maltodextrin | 9.00 |
| dextrose | 8.50 |
| sugar | 6.00 |
| canola oil | 4.50 |
| sunflower oil | 4.50 |
| hydrolized gelatin | 2.60 |
| skim milk powder | 1.60 |
| cocoa powder (10/12) | 1.10 |
| vitamin/mineral premix | 0.95 |
| deoiled granular lecithin | 0.50 |
| carrageenan | 0.19 |
| salt | 0.08 |
|  | 100.00 |

Per 260 gram (235 ml.) serving, the composition thus prepared had a caloric content of 483 (2020 kJ) and contained 8 grams of protein, 62 grams of carbohydrate and a total of 25 grams of fat. The fat was comprised of 12 grams of polyunsaturates, 9.3 grams of monounsaturates, 2.3 grams of saturates and 1 milligram of cholesterol. The carbohydrate to protein weight-to-weight ratio was thus 7.75:1, and the protein to fat weight-to-weight ratio was 0.32:1. Each 260 gram (235 ml.) serving contained the following amino acids in approximately the following amounts:

| | |
| --- | --- |
| glycine | 1.310 g. |
| serine | 0.300 g. |
| lysine | 0.325 g. |
| alanine | 0.577 g. |
| aspartic acid | 0.517 g. |
| glutamic acid | 0.997 g. |
| proline | 1.018 g. |
| arginine | 0.538 g. |
| hydroxyproline | 0.601 g. |
| phenylalanine | 0.208 g. |
| tryptophan | 0.034 g. |
| threonine | 0.197 g. |
| valine | 0.273 g. |
| isoleucine | 0.205 g. |
| histidine | 0.156 g. |
| leucine | 0.349 g. |
| tyrosine | 0.136 g. |
| methionine | 0.094 g. |

Thus, the weight to weight ratio of Group A to Group B amino acids was 3.74:1. The weight-to-weight ratio of Group A* to Group B amino acids was 2.38:1.

EXAMPLE 3

A commercial quantity of the chocolate-flavored liquid composition of Example 2 was made (with some very minor variations in weight percentages as shown) with the ingredients in the following amounts:

|  |  | wt.% |
| --- | --- | --- |
| skim milk powder | 005.008 kg. | 001.59 |
| hydrolyzed gelatin | 008.139 kg. | 002.59 |
| maltodextrin | 028.172 kg. | 008.95 |
| dextrose | 026.607 kg. | 008.45 |
| sugar | 018.781 kg. | 005.97 |
| cocoa powder (10/12) | 003.756 kg. | 001.19 |
| salt | 000.250 kg. | 000.08 |
| carrageenan | 000.939 kg. | 000.30 |
| vitamin/mineral premix | 003.000 kg. | 000.95 |
| deoiled granular lecithin | 001.565 kg. | 000.49 |
| canola oil | 014.086 kg. | 004.48 |
| sunflower oil | 014.086 kg. | 004.48 |
| water | 190.378 kg. | 060.48 |
|  | 314.767 kg. | 100.00 |

The previously weighed dry ingredients were mixed and added to a stirred tank containing the water. The mixture was stirred until it was of a smooth consistency at which time the canola and sunflower oils were added. The resultant mixture was processed through a colloid mill and transferred to a 500 liter steam-heated kettle and heated to 185° F. with stirring. The liquid composition was then transferred to a filling machine where the composition was deposited in 250 ml. cans each containing 260 g. of the product (235 ml. when at room temperature). The cans were hermetically sealed and transferred to a steam retort for sterilization at 240° F. for 15–20 minutes. The cans thus sterilized were then conveyed to a water bath and cooled to room temperature for labelling and packaging in cardboard canons each containing 24 cans. 1200 cans or 50 cases of 24 cans are thus produced.

EXAMPLE 4

A vanilla-flavored liquid composition was prepared using the method of manufacture of Example 1 containing the following ingredients in the following weight percentages:

|  | wt.% |
| --- | --- |
| water | 60.46 |
| dextrose | 10.00 |
| maltodextrin | 8.00 |
| sugar | 6.00 |
| canola oil | 4.50 |
| sunflower oil | 4.50 |
| hydrolized gelatin | 2.80 |
| skim milk powder | 1.80 |
| vitamin/mineral premix | 0.95 |
| deoiled granular lecithin | 0.50 |
| carrageenan | 0.22 |
| color (titanium dioxide) | 0.20 |
| salt | 0.05 |
| flavor (vanillin + ethyl vanillin) | 0.02 |
|  | 100.00 |

Per 260 gram (235 ml.) serving, the composition thus prepared had a caloric content of 483 (2020 kJ) and contained 8 grams of protein, 62 grams of carbohydrate and a total of 25 grams of fat. The fat was comprised of 12 grams of polyunsaturates, 9.3 grams of monounsaturates, 2.4 grams of saturates and 1 milligram of cholesterol. The carbohydrate to protein weight-to-weight ratio was thus 7.75:1, and the protein to fat weight-to-weight ratio was 0.32:1. Each 260 gram (235 ml.) serving contained the following amino acids in approximately the following amounts:

| | |
|---|---|
| glycine | 1.377 g. |
| serine | 0.283 g. |
| lysine | 0.322 g. |
| alanine | 0.584 g. |
| aspartic acid | 0.501 g. |
| glutamic acid | 0.960 g. |
| proline | 1.068 g. |
| arginine | 0.543 g. |
| hydroxyproline | 0.647 g. |
| phenylalanine | 0.190 g. |
| tryptophan | 0.027 g. |
| threonine | 0.186 g. |
| valine | 0.259 g. |
| isoleucine | 0.198 g. |
| histidine | 0.155 g. |
| leucine | 0.332 g. |
| tyrosine | 0.125 g. |
| methionine | 0.093 g. |

Thus, the weight to weight ratio of Group A to Group B amino acids was 4.02:1. The weight-to-weight ratio of Group A* to Group B amino acids was 2.59:1.

EXAMPLE 5

A strawberry-flavored liquid composition was prepared using the method of manufacture of Example 1 containing the following ingredients in the following weight percentages:

| | wt.% |
|---|---|
| water | 60.10 |
| dextrose | 10.20 |
| maltodextrin | 7.50 |
| sugar | 6.47 |
| canola oil | 4.50 |
| sunflower oil | 4.50 |
| hydrolized gelatin | 2.80 |
| skim milk powder | 1.80 |
| vitamin/mineral premix | 0.95 |
| deoiled granular lecithin | 0.50 |
| carrageenan | 0.30 |
| color | 0.12 |
| citric acid | 0.12 |
| strawberry flavor | 0.09 |
| salt | 0.05 |
| | 100.00 |

Per 260 gram (235 ml.) serving, the composition thus prepared had a caloric content of 486 (2030 kJ) and contained 8 grams of protein, 62 grams of carbohydrate and a total of 25 grams of fat. The fat was comprised of 12 grams of polyunsaturates, 9.3 grams of monounsaturates, 2.4 grams of saturates and 1 milligram of cholesterol. The carbohydrate to protein weight-to-weight ratio was thus 7.75:1, and the protein to fat weight-to-weight ratio was 0.32:1. :Each 260 gram (235 ml.) serving contained the following amino acids in approximately the following amounts:

| | |
|---|---|
| glycine | 1.377 g. |
| serine | 0.283 g. |
| lysine | 0.322 g. |
| alanine | 0.584 g. |
| aspartic acid | 0.501 g. |
| glutamic acid | 0.960 g. |
| proline | 1.068 g. |
| arginine | 0.543 g. |
| hydroxyproline | 0.647 g. |
| phenylalanine | 0.190 g. |
| tryptophan | 0.027 g. |
| threonine | 0.186 g. |
| valine | 0.259 g. |
| isoleucine | 0.198 g. |
| histidine | 0.155 g. |
| leucine | 0.332 g. |
| tyrosine | 0.125 g. |
| methionine | 0.093 g. |

Thus, the weight to weight ratio of Group A to Group B amino acids was 4.02:1. The weight-to-weight ratio of Group A* to Group B amino acids was 2.59:1.

EXAMPLE 6

A viscous liquid nutritional composition is made containing the following ingredients:

| | wt.% |
|---|---|
| gelatin | 4.000 |
| egg white powder | 0.050 |
| wheat flour | 0.150 |
| maltodextrin 10 DE | 5.000 |
| dextrose | 5.000 |
| sugar | 4.000 |
| salt | 0.050 |
| carrageenan PMD | 0.500 |
| vitamin/mineral mix | 0.800 |
| titanium dioxide | 0.300 |
| vanillin | 0.015 |
| ethyl vanillin | 0.005 |
| lecithin | 0.500 |
| canola oil | 3.000 |
| sunflower oil | 6.000 |
| water | 70.630 |
| | 100.000 |

Per 260 gram serving, this composition has a protein content of 9.11 grams, a carbohydrate content of 34.86 grams, a fat content of 24.58 grams, and a caloric content of 397. Accordingly, the carbohydrate to protein weight to weight ratio is 3.82:1. The weight to weight ratio of Group A amino acids to Group B amino acids is 5.86:1 and the weight to weight ratio of Group A* amino acids to Group B amino acids is 3.87:1.

EXAMPLE 7

A pudding-like nutritional composition is made containing the following ingredients:

| | wt.% |
|---|---|
| skim milk powder | 0.500 |
| gelatin | 3.000 |
| egg white powder | 1.000 |
| wheat flour | 0.500 |
| maltodextrin 10 DE | 18.000 |
| dextrose | 16.000 |
| sugar | 12.000 |
| salt | 0.100 |
| guar gum | 1.000 |
| vitamin/mineral mix | 0.850 |
| color | 0.100 |
| flavor | 0.050 |
| lecithin | 1.000 |

-continued

|  | wt.% |
|---|---|
| canola oil | 4.000 |
| sunflower oil | 4.000 |
| water | 37.900 |
|  | 100.000 |

Per 150 gram serving, this composition has a protein content of 5.56 grams, a carbohydrate content of 66.44 grams, a fat content of 13.38 grams, and a caloric content of 408. Accordingly, the carbohydrate to protein weight to weight ratio is 11.94:1. The weight to weight ratio of Group A amino acids to Group B amino acids is 3.44:1 and the weight to weight ratio of Group A* amino acids to Group B amino acids is 2.11:1.

EXAMPLE 8

A pudding-like nutritional composition is made containing the following ingredients:

|  | wt.% |
|---|---|
| gelatin | 4.000 |
| wheat flour | 2.000 |
| maltodextrin 10 DE | 18.000 |
| dextrose | 16.000 |
| sugar | 11.000 |
| xanthan gum | 0.750 |
| flavor | 0.250 |
| lecithin | 0.500 |
| canola oil | 2.000 |
| sunflower oil | 5.000 |
| water | 40.500 |
|  | 100.000 |

Per 150 gram serving, this composition has a protein content of 5.58 grams, a carbohydrate content of 65.98 grams, a fat content of 11.27 grams, and a caloric content of 388. Accordingly, the carbohydrate to protein weight to weight ratio is 11.83:1. The weight to weight ratio of Group A amino acids to Group B amino acids is 5.52:1 and the weight to weight ratio of Group A* amino acids to Group B amino acids is 3.67:1.

EXAMPLE 9

A viscous liquid nutritional composition is made containing the following ingredients:

|  | wt.% |
|---|---|
| skim milk powder | 4.000 |
| gelatin | 3.500 |
| egg white powder | 0.500 |
| maltodextrin 10 DE | 8.000 |
| dextrose | 5.000 |
| sugar | 4.000 |
| salt | 0.100 |
| xanthan gum | 0.500 |
| vitamin/mineral mix | 0.900 |
| color | 0.050 |
| flavor | 0.200 |
| lecithin | 0.500 |
| canola oil | 4.000 |
| sunflower oil | 6.000 |

-continued

|  | wt.% |
|---|---|
| water | 62.750 |
|  | 100.000 |

Per 150 gram serving, this composition has a protein content of 7.31 grams, a carbohydrate content of 27.47 grams, a fat content of 15.72 grams, and a caloric content of 281. Accordingly, the carbohydrate to protein weight to weight ratio is 3.76:1. The weight to weight ratio of Group A amino acids to Group B amino acids is 3.04:1 and the weight to weight ratio of Group A* amino acids to Group B amino acids is 1.88:1.

EXAMPLE 10

A nutritional composition is made having a "chocolate bar"-like consistency by combining the following ingredients in the following weight percentages:

|  | wt.% |
|---|---|
| dextrose | 23.00 |
| sugar | 17.70 |
| modified corn starch | 10.00 |
| hydrogenated soybean and cottonseed oil | 10.00 |
| crisp rice | 8.00 |
| hydrolyzed gelatin | 6.50 |
| water | 5.00 |
| walnut oil | 5.00 |
| cocoa powder | 4.50 |
| safflower oil | 4.00 |
| Duromel coating fat | 1.50 |
| xanthan gum | 1.10 |
| peanut butter | 1.00 |
| skim milk powder | 1.00 |
| deoiled granular lecithin | 1.00 |
| mono- and diglycerides (emulsifier - soy based) | 0.30 |
| natural flavor | 0.25 |
| salt | 0.15 |
|  | 100.00 |

The solid product may contain added vitamins and minerals in desired amounts. Per 100 gram serving, the composition has an energy content of 450 calories (1880 kJ) and contains 7.7 grams of protein, 59 grams of carbohydrate/glucides and 23 grams of fat comprised of 12 grams polyunsaturates, 5.2 grams monounsaturates and 3.8 grams saturates. Thus, the carbohydrate to protein weight to weight ratio is 7.65:1 and the protein to fat weight to weight ratio is 0.34:1. The weight to weight ratios of Group A amino acids to Group B amino acids and of Group A* amino acids to Group B amino acids are 3.32:1 and 2.05:1, respectively.

EXAMPLE 11

A composition is made having a pudding-like consistency by combining the following ingredients in the following weight percentages:

|  | wt.% |
|---|---|
| water | 35.00 |
| dextrose | 15.00 |
| invert sugar (67% solids) | 15.00 |

-continued

|  | wt.% |
|---|---|
| maltodextrin | 13.00 |
| hydrolyzed gelatin | 5.50 |
| safflower oil | 5.50 |
| canola oil | 5.00 |
| skim milk powder | 3.00 |
| modified corn starch | 2.50 |
| mono- and diglycerides (emulsifier - soy based) | 0.30 |
| flavor | 0.15 |
| salt | 0.04 |
| color | 0.01 |
|  | 100.00 |

The composition may contain added vitamins and minerals. The composition of pudding-like consistency has per 142 gram serving in an aseptically filled cup an energy content of 400 calories (1670 kJ). The product contains per serving 8.2 grams of protein, 56 grams of carbohydrate/glucides and 15 grams of fat, the latter comprised of 8.2 grams of polyunsaturates, 5.2 grams of monounsaturates, 1.3 grams of saturates and 1 milligram of cholesterol. Accordingly, the composition has a carbohydrate to protein weight to weight ratio of 6.83:1 and a protein to fat weight to weight ratio of 0.55:1. The weight to weight ratios of Group A amino acids to Group B amino acids and of Group A* amino acids to Group B amino acids are 4.21:1 and 2.72:1, respectively.

EXAMPLE 12

Eighteen patients suffering from Parkinson's Disease were administered the compositions of Examples 2, 4 and 5, according to their desire for a particular flavoring (chocolate, vanilla or strawberry). The patients were supplied with an 8 ounce (225 ml.) serving per day. Instructions given to the patients were to eat the usual breakfast and supper and substitute the composition for their regular lunch. Additional servings of the composition were made available on a supervised basis so that, if a patient were to go out in the evening from time to time, a serving of the composition could be substituted for that patient's supper as well.

The results were as follows:

Patient 1: 68 year old male, has had Parkinson's disease for 12 years, drug regimen: SINEMET® 100/25 (levodopa-carbidopa containing per tablet 100 mg. of levodopa and 25 mg. of carbidopa) four times daily, SINEMET® CR (controlled release levodopa-carbidopa containing per tablet 200 mg. of levodopa and 50 mg. of carbidopa) twice nightly, and ELDEPRYL® (selegiline hydrochloride containing per tablet 5 mg. of selegiline hydrochloride) twice daily.

Results: For two years prior, Patient 1 was able to work only mornings and had to go to bed after lunch. He began taking a commercial nutritional composition containing low protein (SUPLENA®). He showed some improvement on this regimen but found the product excessively sweet and difficult to drink. Upon commencing to use the composition of the present invention, he reported a great increase in energy levels and has been able to work in the afternoons ever since. He has continued to use the inventive composition and his improvement has continued. Patient 1 noticed some increase in his dyskinesias. He was able to cut his daily dose of levodopa-carbidopa by one-third and of selegiline hydrochloride by one-half, whereupon his dyskinesias have disappeared.

Patient 2: 72 year old male, has had Parkinson's disease for 15 years, drug regimen: SINEMET® 100/25 four times daily plus ELDEPRYL® twice daily.

Results: Patient 2 is a retired banker. For two years, he was active only in the mornings. As with Patient 1, Patient 2 began taking SUPLENA® instead of his regular lunch. He noticed a slight improvement but, on commencing use of the compositions of Examples 2, 4 and 5 in place of the SUPLENA®, he reported an immediate dramatic improvement. He has since has been active with an increased energy level for a full day. His Parkinson's symptoms have disappeared and he noticed a slight increase in dyskinesias. He reduced his SINEMET® by one pill per day and his dyskinesias have all disappeared.

Patient 3: 63 year old male, has had Parkinson's disease for 4 years, drug regimen: PROLOPA® 100/25 (levodopa-benserazide containing per capsule 100 mg. of levodopa and 25 mg. of benserazide).

Results: Upon commencing the use of the compositions of the present invention, Patient 3 noticed an immediate improvement in all of his Parkinson's symptoms and particularly noticed an increase of energy.

Patient 4: 61 year old female, has had Parkinson's disease for fifteen years, drug regimen: PROLOPA® 100/25 four times daily, SINEMET® CR three times nightly, ELDEPRYL® after breakfast.

Results: Patient 4 reported an improvement in energy on the same day as she commenced using the compositions of Examples 2, 4 and 5. She has observed no difference in her dyskinesias.

Patient 5: 75 year old female, has had Parkinson's disease for 3 years, drug regimen: SINEMET® 100/25 three times daily, SINEMET® CR once at bedtime, bromocriptine mesylate (an anti-Parkinsonian) twice daily and ELDEPRYL® twice daily.

Results: Patient 5 is a literary searcher. Prior to commencing use of the compositions of Examples 2, 4 and 5, she was able to work only two hours per day. Upon commencing use of the compositions, she noticed an immediate increase in energy and was able to return to work at home on a full-time basis.

Patient 6: 42 year old male, has had Parkinson's disease for one year, drug regimen: SINEMET® 100/25 twice daily plus bromocryptine mesylate twice daily.

Results: Despite the only relatively recent onset of Parkinson's disease, Patient 6 has been hit very quickly and very hard with all the symptoms typical of Parkinson's disease. Upon commencing use of the compositions of Examples 2, 4 and 5, the patient's family reported noticing an immediate increase in Patient 6's energy level. He sleeps less in the afternoon and is more active. He walks to the store, something he could rarely do before.

Patient 7: 86 year old female, has had Parkinson's disease for 20 years, drug regimen: SINEMET® 100/25 three times daily, ARTANE® (trihexyphenidyl hydrochloride, an anticholinergic/anti-Parkinsonian) three times daily, SINEMET® CR once at bedtime and ELDEPRYL® once in the morning after breakfast.

Results: Patient 7 is in the final stages of Parkinson's disease and is generally confined to bed. Upon commencing the use of the compositions of Examples 2, 4 and 5 and, since, her symptoms have not improved. However, Patient 7 reports that she is feeling better. She stays out of bed for two hours in the morning and in the afternoon, sitting in a chair. She was unable to do this prior to commencing the use of the Examples 2, 4 and 5 compositions.

Patient 8: 65 year old female, has had Parkinson's disease for 12 years, drug regimen: PROLOPA® 100/25 three times daily and ELDEPRYL® twice daily.

Results: Patient 8 has been unable to work for three years. Upon commencing the use of the compositions of Examples 2, 4 and 5, she noticed a marked increase in her energy levels and dyskinesias. Upon reducing her dose of PROLOPA® to twice daily, the dyskinesias disappeared and her energy level remained improved.

Patient 9: 60 year old female, has had Parkinson's disease for 6 years, drug regimen: SINEMET® 100/25 three times daily and bromocryptine mesylate once daily.

Results: Patient 9's symptoms are well controlled on the drug regimen noted above. No change was observed upon the patient commencing the use of the composition of the present invention.

Patient 10: 57 year old female, has had Parkinson's disease for 6 years, drug regimen: PROLOPA® 50/12.5 (levodopa-benserazide containing per capsule 50 mg. of levodopa and 12.5 mg. of benserazide) three times daily and ELDEPRYL® once daily after breakfast.

Results: Prior to commencing the use of the inventive compositions, Patient 10, an office worker, was severely restricted by Parkinson's symptoms after lunch, unless she only had a salad. If she ate anything else for lunch, she would have an onset of sudden weakness thirty minutes after completing her meal and, within minutes, would have to lie down for at least an hour. Alternatively, if Patient 10 had a salad for lunch, by 4:00 pm she was so hungry that she could not stay at work. Her employer and coworkers are very considerate, but Patient 10 felt she was putting too much of a burden on her colleagues and was considering quitting work. Upon commencing the use of the composition of the present invention, Patient 10 has had a striking resurgence in her energy level. She is now able to work a full day. She has noticed a slight increase in dyskinesias but has not changed her medication. Patient 10 has now discarded her plan to retire.

Patient 11: 81 year old female, has had Parkinson's disease for 8 years, drug regimen: ARTANE® three times daily, SINEMET® 100/25 three times daily, SINEMET® CR once at bedtime, once at midnight and once at 4:00 a.m., ELDEPRYL® twice daily, bromocriptine mesylate twice daily, DIABETA® (glyburide, an antidiabetic) three times daily and FLORINEF® (fludrocortisone acetate, a salt-regulating adrenocortical steroid) once every morning after breakfast.

Results: Patient 11 is managing remarkably well and still does volunteer work at a hospital but shuffles and shakes despite taking numerous medications. Patient 11 has been taking the compositions of Examples 2, 4 and 5 for one and one-half months and feels there has been a reduction in her symptoms.

Patient 12: 72 year old male, has had Parkinson's disease for over 20 years, drug regimen: SINEMET® 100/25 four times daily, SINEMET® CR three times daily, at bedtime, midnight and 4:00 a.m., ELDEPRYL® twice daily, after breakfast and lunch and INDERAL® (propanolol hydrochloride, a cardiac depressant) 80 mg. twice daily.

Results: Upon commencing the use of the compositions of Examples 2, 4 and 5, Patient 12 showed an immediate improvement. All of his Parkinson's symptoms have improved and he especially notices increased energy levels. He is also more relaxed.

Patient 13: 67 year old female, has had Parkinson's disease for 8 years, drug regimen: SINEMET® 100/25 four times daily, SINEMET® CR once at bedtime and ELDEPRYL® twice daily after breakfast and lunch.

Results: Commencing in the eighth year of her Parkinson's disease, Patient 13 developed fatigue, in addition to her tremor and rigidity. Her usual lunch was a hamburger until commencing with the use of the compositions of Examples 2, 4 and 5. While on the daily hamburger regimen, Patient 13 would invariably develop weak spells and would have to lie down. Since Patient 13 has been on the regimen of the compositions of Examples 2, 4 and 5, her weak spells have disappeared as has her need to lie down following lunch. She has noticed no change in her major symptoms, but in the first few days of the new regimen, she noticed a slight increase in dyskinesias. She did not alter her medication and her dyskinesias have gradually disappeared.

Patient 14: 54 year old female, has had Parkinson's disease for 3 years, drug regimen: no medication.

Results: Patient 14 is a librarian whose symptoms of Parkinson's disease at this stage consist of a slight tremor and inability to get out of bed every night. Her work pattern has not yet been interrupted. She has been taking the compositions of Examples 2, 4 and 5 in accordance with the prescribed regimen for three weeks but has noticed no difference in her condition.

Patient 15: 53 year old male, has had Parkinson's disease for 6 years, drug regimen: SINEMET® 100/25 three times daily.

Results: Patient 15 is a senior Government bureaucrat whose Parkinson's disease, until recently, was well controlled using SINEMET®. In the last four months of his condition, the tremor broke through and he had intended to resign his position due to his extreme fatigue. He commenced using the compositions of Examples 2, 4 and 5 and taking ELDEPRYL® twice daily and has improved remarkably. Patient 15 has abandoned his plan to retire.

Patient 16: 55 year old female, has had Parkinson's disease for 4 years, drug regimen: PROLOPA® 50/12.5 three times daily and ELDEPRYL twice daily after breakfast and lunch.

Results: In the fourth year of her disease, Patient 16 suffered the rapid onset of Parkinson's symptoms, her major problem being the repeated off/on of the disease. She found that the off/on variations were occurring as many as twelve times daily. Since commencing the use of the compositions of Examples 2, 4 and 5, Patient 16 has seen a remarkable improvement in the off/on nuisance which has been reduced to once or twice every afternoon.

Patient 17: 60 year old male, has had Parkinson's disease for 6 years, drug regimen: SINEMET® 100/25 six times daily, SINEMET® CR three times through the night, bromocriptine mesylate once daily, PERMAX® (pergolide mesylate, a dopamine agonist) once at bedtime, ELDEPRYL® twice daily and ARTANE®.

Results: Patient 17 is totally confined to his home in a wheelchair. He has been on numerous medications but nothing helps. Upon commencing the use of the compositions of Examples 2, 4 and 5, his symptoms did not improve appreciably nor have his dyskinesias changed. However, he notices that he has much more energy throughout the day and he no longer sleeps in the afternoon.

Patient 18: 55 year old female, has had Parkinson's disease for 1 year, drug regimen: SINEMET® 100/25 twice daily and ELDEPRYL® once every morning.

Results: Upon commencing the use of the compositions of Examples 2, 4 and 5, Patient 18 reported that her afternoon fatigue had disappeared. At first, she noticed some increase in her dyskinesias but upon discontinuing one SINEMET® and the ELDEPRYL®, the dyskinesias have now disappeared.

The foregoing Examples are intended to illustrate the present invention only, and are not to be taken as limiting the scope of the invention as fully disclosed and set out in the appended claims.

I claim:

1. A nutritional composition for the management of protein intake which comprises a first weight-to-weight ratio of carbohydrate to protein of from about 3.5:1 to about 12:1, and a second A:B weight-to-weight ratio of from about 3:1 to about 6.5:1 wherein:

A is the group of amino acids consisting of glycine, serine, lysine, alanine, aspartic acid, glutamic acid, proline, arginine and hydroxyproline; and B is the group of amino acids consisting of phenylalanine, tryptophan, threonine, valine, isoleucine, histidine, leucine, tyrosine and methionine.

2. A composition according to claim 1 wherein said first ratio is from about 7:1 to about 12:1.

3. A composition according to claim 2 wherein said first ratio is from about 7:1 to about 8:1.

4. A composition according to claim 3 wherein said first ratio is about 7.5:1.

5. A composition according to claim 1 wherein said second A:B ratio is from about 4:1 to about 5:1.

6. A composition according to claim 1 wherein said second A:B ratio is about 4.5:1.

7. A composition according to claim 2, 3 or 4 wherein said second A:B ratio is from about 4:1 to about 5:1.

8. A composition according to claim 2, 3 or 4 wherein said second A:B ratio is about 4.5:1.

9. A composition according to any of claims 1–6 further comprising a third A*:B weight-to-weight ratio of from about 1.5:1 to about 4.5:1 wherein:

A* is the group of amino acids consisting of glycine, glutamic acid, proline and hydroxyproline; and B is the group of amino acids consisting of phenylalanine, tryptophan, threonine, valine, isoleucine, histidine, leucine, tyrosine and methionine.

10. A composition according to claim 9 wherein said third A*:B ratio is from about 2.5:1 to about 3.5:1.

11. A composition according to claim 10 wherein said third A*:B ratio is about 3:1.

12. A method of managing protein intake comprising the administration of a composition which comprises a first weight-to-weight ratio of carbohydrate to protein of from about 3.5:1 to about 12:1 and a second A:B weight-to-weight ratio of from about 3:1 to about 6.5:1 wherein:

A is the group of amino acids consisting of glycine, serine, lysine, alanine, aspartic acid, glutamic acid, proline, arginine and hydroxyproline; and B is the group of amino acids consisting of phenylalanine, tryptophan, threonine, valine, isoleucine, histidine, leucine, tyrosine and methionine.

13. A method according to claim 12 wherein said composition additionally comprises a third A*:B weight-to-weight ratio of from about 1.5:1 to about 4.5:1 wherein:

A* is the group of amino acids consisting of glycine, glutamic acid, proline and hydroxyproline; and B is the group of amino acids consisting of phenylalanine, tryptophan, threonine, valine, isoleucine, histidine, leucine, tyrosine and methionine.

14. A method according to claim 13 wherein said first ratio is from about 7:1 to about 12:1.

15. A method according to claim 14 wherein said first ratio is from about 7:1 to about 8:1.

16. A method according to claim 15 wherein said first ratio is about 7.5:1.

17. A method according to claim 12 wherein said second A:B ratio is from about 4:1 to about 5:1.

18. A method according to claim 12 wherein said second A:B ratio is about 4.5:1.

19. A method according to claim 14, 15 or 16 wherein said second A:B ratio is from about 4:1 to about 5:1.

20. A method according to claim 14, 15 or 16 wherein said second A:B ratio is about 4.5:1.

21. A method according to claim 13 wherein said third A*:B ratio is from about 2.5:1 to about 3.5:1.

22. A method according to claim 13 wherein said third A*:B ratio is about 3:1.

* * * * *